(12) United States Patent
Mohrlock

(10) Patent No.: US 11,820,196 B2
(45) Date of Patent: Nov. 21, 2023

(54) SUSPENSION ARM FOR A CHASSIS OF A VEHICLE, IN PARTICULAR A MOTOR VEHICLE, AND VEHICLE, IN PARTICULAR A MOTOR VEHICLE

(71) Applicant: AUDI AG, Ingolstadt (DE)

(72) Inventor: Dominik Mohrlock, Buxheim (DE)

(73) Assignee: AUDI AG, Ingolstadt (DE)

( * ) Notice: Subject to any disclaimer, the term of this patent is extended or adjusted under 35 U.S.C. 154(b) by 200 days.

(21) Appl. No.: 17/439,053

(22) PCT Filed: Feb. 18, 2020

(86) PCT No.: PCT/EP2020/054200
§ 371 (c)(1),
(2) Date: Sep. 14, 2021

(87) PCT Pub. No.: WO2020/187519
PCT Pub. Date: Sep. 24, 2020

(65) Prior Publication Data
US 2022/0153075 A1    May 19, 2022

(30) Foreign Application Priority Data
Mar. 20, 2019  (DE) .................. 10 2019 203 832.8

(51) Int. Cl.
*B60G 7/00* (2006.01)

(52) U.S. Cl.
CPC .......... *B60G 7/001* (2013.01); *B60G 2206/11* (2013.01); *B60G 2206/16* (2013.01); *B60G 2206/722* (2013.01); *B60G 2206/82* (2013.01)

(58) Field of Classification Search
CPC ................ B60G 7/001; B60G 2206/11; B60G 2206/16; B60G 2206/722; B60G 2206/82;
(Continued)

(56) References Cited

U.S. PATENT DOCUMENTS 5,992,867 A * 11/1999 Kato ..................... B60G 7/001
                                              280/124.134
9,415,650 B2 * 8/2016 Bromme .................. B60T 5/00
(Continued)

FOREIGN PATENT DOCUMENTS

| DE | 10014603 A1 | 10/2001 |
| DE | 102006051609 A1 | 5/2008 |

(Continued)

OTHER PUBLICATIONS

Examination Report dated Feb. 23, 2022, in connection with corresponding German Application No. 10 2019 203 832.8 (6 pp., including machine-generated English translation).
(Continued)

*Primary Examiner* — Paul N Dickson
*Assistant Examiner* — Timothy Wilhelm
(74) *Attorney, Agent, or Firm* — Maier & Maier, PLLC

(57) ABSTRACT

A suspension arm for a chassis of a vehicle, having a first shell element which has a first open cross-section and having a second shell element which is connected to the first shell element and has a second open cross-section. The second shell element is arranged at least in part in the first open cross-section, and the open cross-sections are open in the same direction.

7 Claims, 2 Drawing Sheets

(58) Field of Classification Search
CPC ........ B60G 2206/013; B60G 2206/162; B60G 2300/12
See application file for complete search history.

(56) References Cited

U.S. PATENT DOCUMENTS

| | | | | |
|---|---|---|---|---|
| 10,814,535 | B2* | 10/2020 | Lee | B29C 45/14344 |
| 10,864,788 | B2* | 12/2020 | Müller | B60G 7/001 |
| 11,241,928 | B2* | 2/2022 | Kim | B60G 7/001 |
| 11,541,710 | B2* | 1/2023 | Hoschouer | B60G 7/005 |
| 2005/0258613 | A1* | 11/2005 | Kleckner | B60G 7/001 |
| | | | | 280/124.156 |
| 2006/0175786 | A1* | 8/2006 | Streubel | B60G 7/001 |
| | | | | 264/254 |
| 2010/0084834 | A1* | 4/2010 | Ersoy | B60G 7/001 |
| | | | | 280/124.1 |
| 2012/0315414 | A1* | 12/2012 | Wesch | B62D 29/005 |
| | | | | 428/34.1 |
| 2020/0223273 | A1* | 7/2020 | Kwon | B29C 45/14754 |
| 2022/0048348 | A1* | 2/2022 | Meyer | B60G 7/001 |

FOREIGN PATENT DOCUMENTS

| | | |
|---|---|---|
| DE | 102010010665 A1 | 9/2011 |
| DE | 102013011589 A1 | 1/2015 |
| DE | 102016107155 A1 | 10/2017 |
| FR | 3036065 A1 | 11/2016 |
| JP | H03-287404 A | 12/1991 |
| JP | H03287404 A * | 12/1991 |
| JP | H11-115429 A | 4/1999 |
| JP | 2003-002025 A | 1/2003 |
| WO | 2014/129046 A1 | 8/2014 |
| WO | 2014/148513 A1 | 2/2017 |

OTHER PUBLICATIONS

International Search Report (with English translation) and Written Opinion (with Machine translation) dated May 27, 2020 in corresponding International Application No. PCT/EP2020/054200; 20 pages.

International Preliminary Report on Patentability dated Sep. 16, 2021 in corresponding International Application No. PCT/EP2020/054200; 15 pages.

* cited by examiner

SUSPENSION ARM FOR A CHASSIS OF A VEHICLE, IN PARTICULAR A MOTOR VEHICLE, AND VEHICLE, IN PARTICULAR A MOTOR VEHICLE

FIELD

The invention relates to a suspension arm for a chassis of a vehicle, in particular of a motor vehicle. The invention further relates to a vehicle, in particular a motor vehicle.

BACKGROUND

DE 10 200 6 051 609 A1 discloses a wheel-guiding suspension arm for a motor vehicle, having a first shell element and having a second shell element with main wall sections extending substantially parallel to one another and parallel to a main extension plane of the suspension arm.

SUMMARY

WO 2014/129046 A1 and WO 2014/148513 A1 also disclose known suspension arms. Furthermore, a chassis suspension arm is known from DE 10 201 3 011 589 A1.

This object is achieved according to the invention by means of a suspension arm and by means of a vehicle.

The object of the present invention is to provide a suspension arm and a vehicle with such a suspension arm, so that the installation space requirements of the suspension arm can be kept especially low.

This object is achieved according to the invention by means of a suspension arm having the features of claim 1 and by means of a vehicle having the features of claim 10. Advantageous embodiments with suitable further embodiments of the invention are indicated in the remaining claims.

A first aspect of the invention relates to a suspension arm for a chassis of a vehicle, which can preferably be designed as a motor vehicle and, in this case, for example, as a motor vehicle, in particular as a passenger car. The suspension arm is also referred to as a control arm, wheel suspension arm, guide suspension arm, or wheel-guiding suspension arm and is a component of the chassis of the vehicle, in particular in the completely manufactured state of the vehicle. In the completely manufactured state of the vehicle, at least or exactly one vehicle wheel of the chassis, which is simply also referred to as a wheel, is coupled in an articulated manner to a body of the vehicle, which is designed, for example, as a self-supporting car body, so that the suspension arm permits relative movements between the body and the vehicle wheel. In particular, the suspension arm enables jounce and rebound movements of the wheel relative to the body, which jounce and rebound movements extend at least in the vertical direction of the vehicle. For this purpose, the suspension arm is coupled to the wheel at least indirectly in an articulated manner on one side or at one end and at least indirectly in an articulated manner on the other side or at the other end. For example, the suspension arm is coupled to a wheel carrier on one side, in which the vehicle wheel is held rotatably on the wheel carrier, in particular via a wheel hub rotatably mounted on the wheel carrier. Thus, for example, the suspension arm is coupled in an articulated manner to the vehicle wheel via the wheel carrier. On the other side, the wheel suspension arm is coupled, for example, in an articulated manner to the body or to a beam axle, which is also referred to as a subframe, auxiliary frame, or integral carrier.

The beam axle is formed separately from the body and is held on the body, so that, for example, the suspension arm is coupled or is connected in an articulated manner to the body via the beam axle. The feature that the suspension arm is coupled or can be coupled in an articulated manner to the vehicle wheel can be understood particularly to mean that the suspension arm can be pivoted relative to the vehicle wheel, while the suspension arm is coupled in an articulated manner to the vehicle wheel. The feature that the suspension arm is coupled or can be coupled in an articulated manner to the body can be understood particularly to mean that the suspension arm can be pivoted relative to the body, while the suspension arm is retained on the body at least indirectly. As its name implies, the suspension arm is used to guide the vehicle wheel relative to the body and to prevent or at least limit undesired relative movements between the vehicle wheel and the body.

The suspension arm has a first shell element which, when considered individually or alone, has a first open cross-section. In addition, the suspension arm comprises a second shell element which is formed separately from the first shell element and is connected to the first shell element and which, when considered individually or alone, has a second open cross-section. The respective open cross-section is also referred to as a hollow cross-section or as an open profile, so that, for example, the respective shell element is designed as an open profile, when considered individually or alone. In this case, it is conceivable that the respective open cross-section is at least substantially C-shaped, such that, for example, the respective shell element has an at least substantially C-shaped, open cross-section or a hollow cross-section.

It is preferably provided that the suspension arm has exactly or exclusively two shell elements, in particular formed in one piece, in which, of the exactly two shell elements, one shell element can be the aforementioned first shell element and the other shell element can be the aforementioned second shell element. As a result, the number of parts and thus the weight and the installation space requirements of the suspension arm can be kept especially low.

In order to keep the installation space requirements of the suspension arm to an especially small scope and simultaneously be able to realize advantageous kinematic properties, it is provided according to the invention that the second shell element is arranged or accommodated at least partially in the first open cross-section, in which the open cross-sections are open in the same direction, that is to say in one and the same direction. The feature that the second shell element is arranged or accommodated at least partially, in particular at least predominantly or completely, in the first open cross-section, can be understood in particular to mean that the second shell element is arranged or accommodated, in particular at least predominantly or completely, in the first open cross-section along the aforementioned direction, also referred to as the first direction. In other words, the feature that the second shell element is at least partially, in particular at least predominantly or completely, arranged or accommodated in the first open cross-section means that the second shell element is arranged or accommodated at least partially, in particular at least predominantly or completely, in the first open cross-section, in a second direction opposite the first direction and, in this case, coinciding with the first direction or extending parallel to the first direction. Within the scope of a method for producing the suspension arm, the suspension arm is thus produced, for example, in such a way that the second shell element moves relative to the first shell element into the second direction and is thereby moved or inserted at least partially, in particular at least predominantly or completely, into the first open cross-section. As a result, the shell elements, which are also referred to simply as shells, are arranged one inside the other at least partially, in particular at least predominantly or completely, along the first direction.

The feature that the open cross-sections are open in the same direction, that is to say in the first direction, can be understood in particular to mean that the first open cross-section, when considered individually or alone, is open in the first direction, in which the second open cross-section, when considered individually or alone, is also open in the first direction. In other words, the first open cross-section is open on a first side of the suspension arm or toward a first side of the suspension arm, while the second open cross-section, when considered individually or alone, is open on the same first side of the suspension arm or toward the same first side of the suspension arm.

It is conceivable that the first open cross-section is supplemented or further developed to form a closed cross-section, that is to say a closed hollow cross-section or a closed profile, in that the second shell element is arranged at least partially in the first open cross-section, so that the suspension arm as a whole has the aforementioned open cross-section or the aforementioned closed profile. The closed cross-section of the suspension arm as a whole is partially delimited by the first shell element and partially by the second shell element. Thus, for example, the suspension arm is designed overall as a closed profile.

On the one hand, by virtue of the fact that the second shell element is arranged at least partially in the first open cross-section along the direction, the installation space requirements of the suspension arm can be kept especially low, so that, for example, in the event of jounce and rebound movements of the vehicle wheel, in which the suspension arm with the vehicle wheel moves relative to the body and relative to further components of the vehicle, collisions between the suspension arm and the components can be avoided. On the other hand, an especially advantageous orientation of connection or kinematic points, in particular relative to one another, can be realized or maintained as compared to conventional solutions, so that especially advantageous kinematics can be realized, according to which the vehicle wheel is to be held or is held on the body, in a movable or articulated manner, via the suspension arm. This can be understood to mean, in particular, that especially advantageous kinematics can be realized, according to which the vehicle wheel moves relative to the body during jounce and rebound movements. The respective connection or kinematic point is to be understood as a physical kinematic or connection point, which is a load introduction point, on or in which, for example, loads or forces resulting from the trip are introduced into the suspension arm and/or transferred from the suspension arm to the wheel or to the body.

In order to keep the installation space requirements especially low and to realize especially advantageous kinematics, it is provided in one embodiment of the invention that the respective open cross-section is delimited, in the second direction opposite the first direction, by a respective main wall section of the respective shell element. The main wall section is also referred to as the main wall or main face. Along a third direction extending perpendicular to the first direction and perpendicular to the second direction, the respective open cross-section is delimited on both sides by respective side wall sections of the respective shell element, which extend at an angle, that is to say diagonal or perpendicular, to the respective main wall section. The respective side wall section is also referred to as a side wall or side face.

In other words, in a fourth direction coinciding with the third direction and extending perpendicular to the first direction and perpendicular to the second direction, the respective open cross-section, when considered individually or alone, is delimited by a first of the respective side wall sections of the respective shell element, and the respective open cross-section, in a fifth direction, which coincides with a third direction and extends perpendicular to the first direction and perpendicular to the second direction, and is opposite the fourth direction. As a result, for example, the respective open cross-section is at least substantially C-shaped, in which the respective main wall section forms a web and the respective side wall section forms a leg of the C-shape. In this case, for example, the legs extend at an angle, that is diagonally or perpendicularly, away from the web, in particular into the first direction. In other words, for example, the legs protrude away from the web, particularly into the first direction. Thus, the legs of the first shell element have the same first direction as the legs of the second shell element.

The respective side wall section is, for example, an end section, which has or forms a free end of the respective shell element when considered individually or alone. In this respect, the feature that the second shell element is arranged in the first shell element or in the first open cross-section, in particular along the first direction or into the second direction, means that the side wall sections of the second shell element are at least partially, in particular at least predominantly or completely, overlapped or covered by the side wall sections of the first shell element, along the third direction.

It has proven to be especially advantageous if the main wall sections are spaced apart from one another along the first direction or along the second direction. As a result, it is possible, for example, to provide the previously mentioned closed cross-section of the suspension arm as a whole such that particularly high rigidity and thus particularly advantageous kinematics can be represented in a manner beneficial to installation space.

It has also been found to be particularly advantageous if the shells are connected to one another via their main wall sections and/or via at least two of the side wall sections or via all side wall sections. Especially advantageous kinematics can thereby be realized in a manner beneficial to installation space.

In order to keep the installation space requirements and the weight particularly low and be able to realize particularly advantageous kinematics, the shell elements are connected to one another in a cohesive and/or force-fitting and/or form-fitting manner and are thus held against one another.

A further embodiment is characterized in that the respective shell element, when considered individually or alone, is formed as a single part. As a result, the number of parts and thus the weight, the costs, and the installation space requirements can be kept especially low.

In an especially advantageous embodiment of the invention, the respective shell element is designed as a sheet-metal shell. Thus, the respective shell element is formed from sheeting, particularly from a thin-walled sheet. The weight and the installation space requirements can thereby be kept especially low.

In a further embodiment of the invention, it is provided that the suspension arm has at least or exactly two bearings, particularly formed separately from one another and/or separately from the shell elements and connected to the shell elements. The respective bearing is designed, for example, as a rubber bearing, so that the suspension arm can be connected to the vehicle wheel particularly advantageously and thus connected to the body or the beam axle. In this case, the suspension arm can be connected or coupled in an articulated manner to the wheel or the wheel carrier of the chassis by means of a first of the bearings. By means of the second bearing, the suspension arm can be connected and thus can be coupled in an articulated manner to the body or to the beam axle of the vehicle. Especially advantageous kinematics can thereby be realized in a manner beneficial to installation space.

In order to keep the installation space requirements particularly low, it is provided in a further embodiment of the invention that the suspension arm is designed as a two-point suspension arm. This is to be understood in particular as meaning that the wheel suspension arm has exactly two connection points and thus has exactly two bearings, one of the bearings being the aforementioned first bearing and the other of the bearings being the aforementioned second bearing.

A second aspect of the invention relates to a vehicle, which has a chassis. The chassis comprises at least one suspension arm, in particular according to the first aspect of the invention. Furthermore, the chassis comprises at least one vehicle wheel, in which the suspension arm is connected to the vehicle wheel in an articulated manner and is designed to guide the vehicle wheel. The vehicle wheel is a ground-contact element, by means of which the vehicle can be supported or is supported downwardly on a piece of ground in the vertical direction of the vehicle. If the vehicle is moved along the ground while the vehicle is being supported downwardly on the ground in the vertical direction of the vehicle, the vehicle wheel rolls on the ground. The suspension arm comprises a first shell element having a first open cross-section and a second shell element having a second open cross-section.

In order to keep the installation space requirements of the suspension arm particularly low and to realize especially advantageous kinematics, it is provided in the second aspect of the invention that the second shell element is arranged at least partially in the first open cross-section, in which the open cross-sections are open in the same direction. Advantages and advantageous embodiments of the first aspect of the invention should be considered advantages and advantageous embodiments of the second aspect of the invention and vice versa.

The invention also includes refinements of the vehicle according to the invention, which have features as they have already been described in association with the refinements of the suspension arm according to the invention. For this reason, the corresponding refinements of the vehicle according to the invention are not described again here. The vehicle according to the invention is designed preferably as a motor vehicle and preferably as an automobile, particularly as a passenger car or commercial vehicle, or as a passenger bus or motorcycle. The invention also comprises the combinations of the features of the described embodiments.

BRIEF DESCRIPTION OF THE FIGURES

An exemplary embodiment of the invention is described in the following. The following is shown.

DETAILED DESCRIPTION

Figure 1:
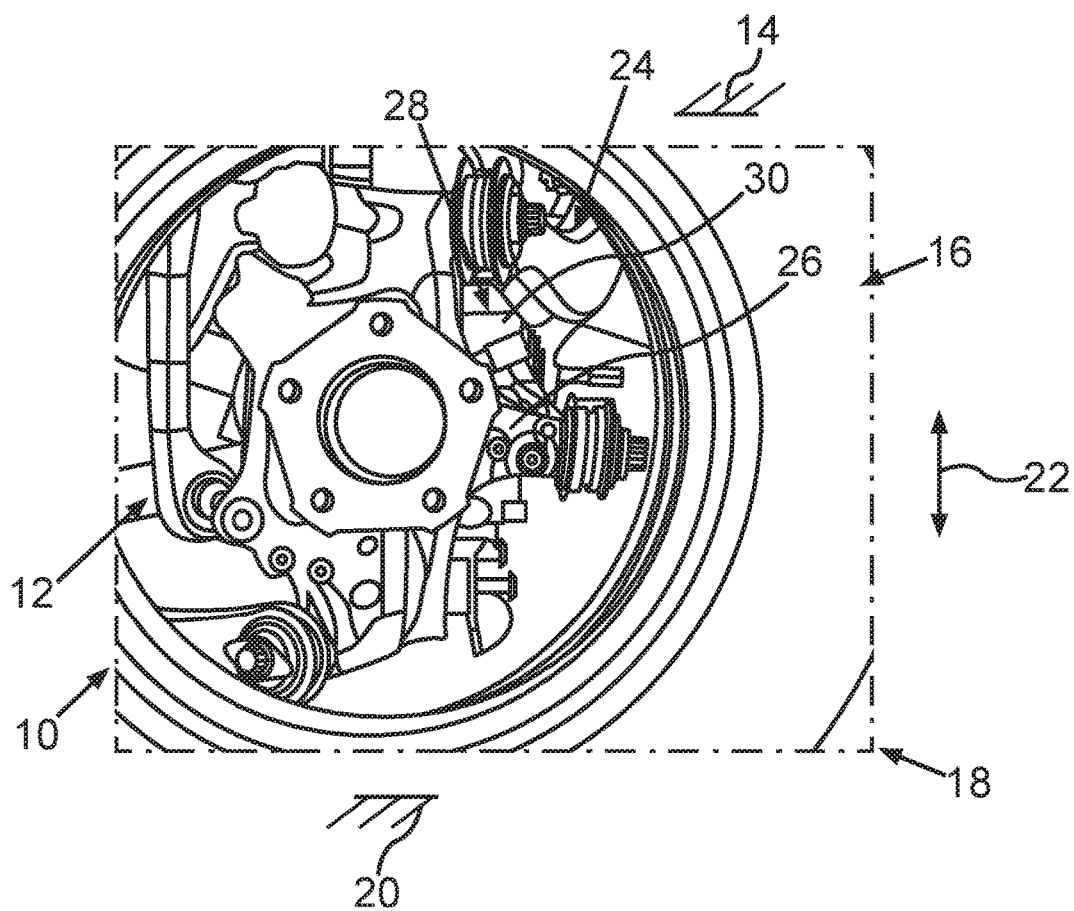
FIG. 1 a schematic sectional perspective view of a vehicle according to the invention.

The exemplary embodiment explained in the following refers to a preferred embodiment of the invention. With the exemplary embodiments, the described components of the embodiment represent individual features to be considered independently of one another, which also further embody the invention independently of one another. Thus, the disclosure should also comprise combinations of the features of the embodiment other than those shown. Furthermore, the described embodiment can also be supplemented through further described features of the invention. The same reference numerals refer to equivalent features and functions in the figures.

FIG. 1 shows a schematic, sectional, perspective view of a vehicle 10, which is formed as a motor vehicle, and, in this case, preferably as an automobile, or particularly as a passenger car. In particular, FIG. 1 shows a part of a chassis 12 of the vehicle. In its fully manufactured state, the vehicle has a body 14, formed in the present case as a self-supporting car body and only shown very schematically in FIG. 1, on which car body the chassis 12 is supported at least indirectly. The chassis 12 comprises, in this case, at least one wheel 16 of an axle 18, which is designed, for example, as a front axle or as a rear axle. The wheel 16 of the vehicle is also characterized as a vehicle wheel and is a ground-contact element, by means of which the vehicle 10 can be supported or is supported downwardly on a piece of ground 20 in the vertical direction of the vehicle. In this case, FIG. 1 illustrates the vertical direction of the vehicle by a double arrow 22. If the vehicle 10 is moved along the ground 20 while the vehicle 10 is being supported downwardly on the ground 20 in the vertical direction of the vehicle, the wheel 16 rolls on the ground 20. The chassis 12 and thus the vehicle 10 furthermore comprise at least one suspension arm 24 which is connected in an articulated manner to the wheel 16 and which is also simply referred to as a wheel suspension arm, guide suspension arm, or suspension arm. The suspension arm 24 is used to guide the wheel 16, particularly relative to the body 14. For this purpose, the suspension arm 24 is coupled, on one side or at one end, to a wheel carrier 26 in an articulated manner, so that the suspension arm 24 can be pivoted relative to the wheel carrier 26, while the suspension arm 24 is coupled to the wheel carrier 26. For example, a wheel hub, which is not shown in the figures, is rotatably mounted on the wheel carrier 26 such that the wheel hub can be rotated about an axis of rotation of the wheel relative to the wheel carrier 26. The wheel 16 is connected to the wheel hub in a fixed manner and can thus rotate, together with the wheel hub, about the axis of rotation of the wheel relative to the wheel carrier 26.

On the other side or at the other end, the suspension arm 24 is at least indirectly coupled in an articulated manner to the body 14. To this end, for example, the suspension arm 24 is coupled in an articulated manner directly to the body 14 at the other end or on the other side, or the suspension arm 24 is connected in an articulated manner to a beam axle which is also referred to as a subframe, integral carrier, or auxiliary frame. The beam axle is a component formed separately from the body 14, which component is held on the body 14 or is connected to the body 14. In this case, for example, the suspension arm 24 can be pivoted relative to the body 14 or relative to the beam axle, while the suspension arm 24 is connected to the beam axle or to the body 14.

Thus, the suspension arm 24 enables relative movements between the wheel 16 and the body 14, in particular within certain limits. In particular, the suspension arm 24 enables relative movements between the wheel 16 and the body 14 which extend at least or exclusively in the vertical direction of the vehicle, so that the wheel 16 can jounce and rebound relative to the body 14 in the vertical direction of the vehicle. In addition, the suspension arm 24 is used to guide the wheel 16 relative to the body 14 and thus to avoid or at least minimize undesired relative movements between the wheel 16 and the body 14.

Furthermore, the chassis 12 comprises a spring and/or damper element 28, which can be seen in detail in FIG. 1, and which, in the exemplary embodiment shown in FIG. 1, is designed, for example, as an air spring. In this case, FIG. 1 shows in detail an outer casing of the air spring, designated as 30.

Figure 2:
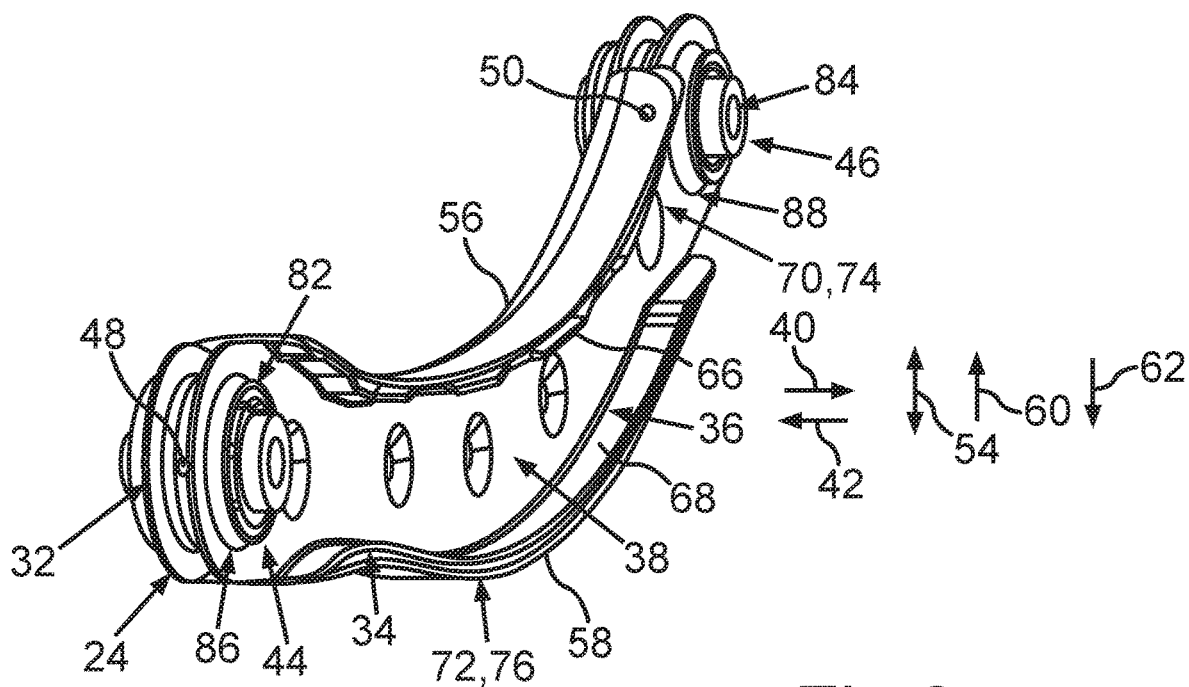
FIG. 2 a schematic perspective view of a suspension arm according to the invention.
Figure 3:
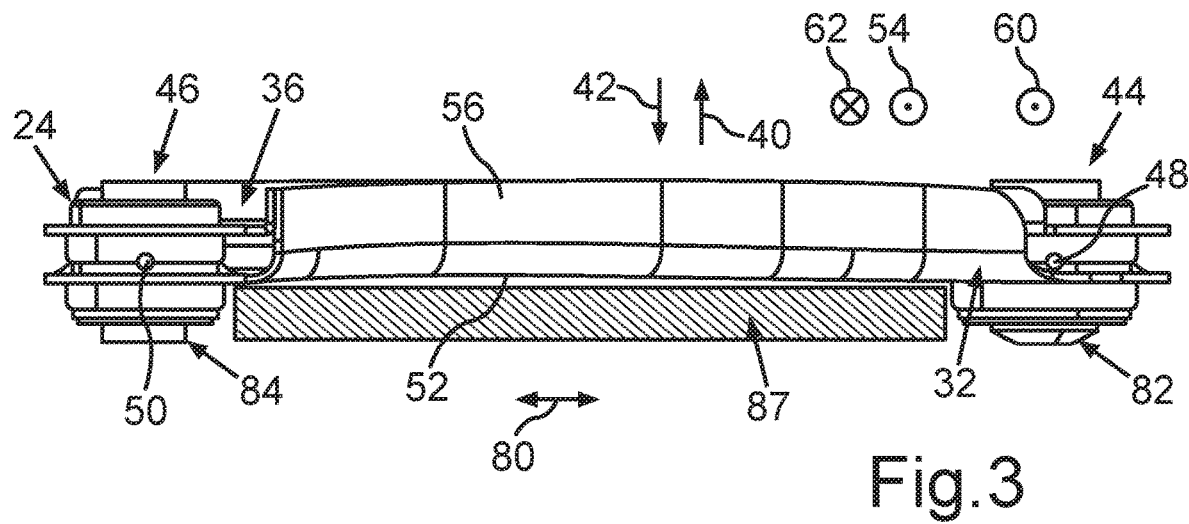
FIG. 3 a schematic top view of the suspension arm.
Figure 4:
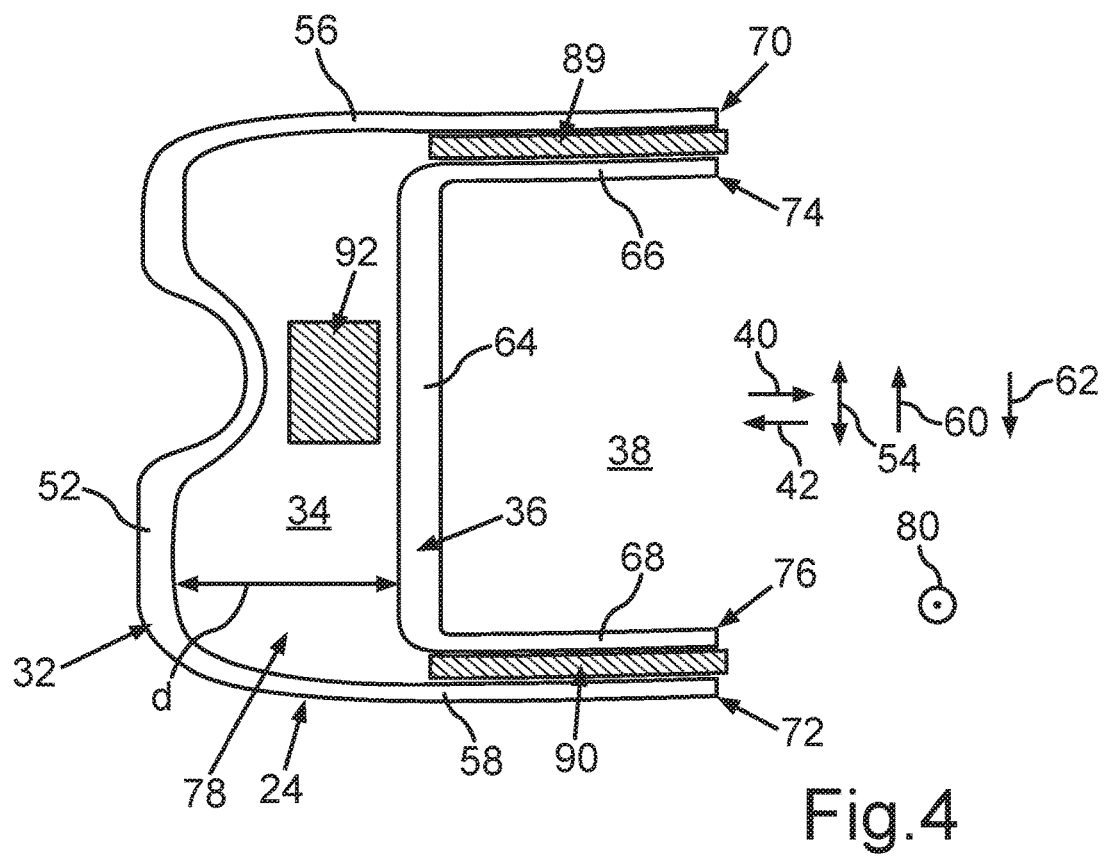
FIG. 4 a schematic cross-sectional view of the suspension arm.

It can be seen especially well from FIGS. 2 to 4 that the suspension arm 24 has a first shell element 32, which has a first cross-section 34 which, when considered individually or alone, is open. Thus, the first shell element 32 is formed as a first open profile and the first shell element 32 has a first open profile. Furthermore, the suspension arm 24 comprises a second shell element 36, which has a second cross-section 38, which is open when considered individually or alone. Thus, the second shell element 36 is also formed as a second open profile or the shell element 36 has a second open profile. Shell elements 32 and 36 are also simply referred to as shells and are two components of the suspension arm 24 which are formed separately from one another and are at least indirectly, in particular directly, connected to one another.

In order to keep the weight and the installation space requirements of the suspension arm 24 especially low and thus, for example, to prevent collisions of the suspension arm 24 with components of the vehicle 10 arranged in its surroundings, in particular of the vehicle 10, and to realize especially advantageous kinematics, that is to say an especially advantageous kinematic connection of the wheel 16 to the body 14, the second shell element 36 is arranged at least partially, in particular at least predominantly or completely, in the first open cross-section 34, in which, open cross-sections 34 and 38 are open in the same direction, as illustrated by an arrow 40 in FIGS. 2 to 4. The feature that the second shell element 36 is at least partially arranged in the first open cross-section 34 can be understood in particular to mean that the second shell element 36 is arranged in a second direction, opposite the first direction, which is indicated by an arrow 42 in FIGS. 2 to 4, and which extends parallel to the first direction and coincides with the first direction, and is arranged at least partially in the second open cross-section 34 and thus is arranged in the first shell element 32. Furthermore, it is provided that respective shell elements 32 and 36 are formed from sheet metal and are thus formed as sheet-metal shells, so that the suspension arm 24 as a whole is designed as a so-called sheet-metal suspension arm.

As a result of the described design of the sheet-metal suspension arm, it is possible to use the sheet-metal suspension arm for an especially advantageous kinematic connection of the wheel 16 to the body 14 or to the beam axle and, while doing so, to prevent undesirable collisions of the sheet-metal suspension arm with the spring and/or damper element 28, in which it is simultaneously possible to prevent the spring and/or damper element 28 from being reduced in its outer circumference or outer diameter and thus in its volume. As a result, the wheel 16 can be supported especially advantageously on the body 14 via the spring and/or damper element 28, as a result of which, especially advantageous and particularly dynamic driving properties of the vehicle 10 can be realized. In addition, especially advantageous connection points 44 and 46 can be realized, as can be seen especially well in FIGS. 2 and 3, at which or via which the suspension arm 24 can be connected or is connected in an articulated manner to the wheel carrier 26 and in an articulated manner to the beam axle or to the body 14. In this case, the suspension arm 24 is coupled to the wheel carrier 26 at or in or via connection point 44, and the suspension arm 24 is coupled to the beam axle or to the body 14 at or in or via connection point 46. Also shown in FIGS. 2 and 3 are so-called physical kinematic points of the suspension arm 24 as 48 and 50. These physical kinematic points 48 and 50 are so-called load introduction points, at which loads and thus forces and/or torques are introduced into the suspension arm 24 and/or transmitted from the suspension arm 24 to the wheel carrier 26 or to the beam axle or to the body 14 particularly during a trip of the vehicle 10. As a result of the described design of the suspension arm 24, an especially advantageous arrangement and orientation of kinematic points 48 and 50 can be realized in particular relative to one another, relative to the wheel carrier 26, and/or relative to the body 14, so that the wheel 16 can be connected to the body 14 via the suspension arm 24 in an especially kinematically advantageous manner.

FIG. 4 shows especially well that, when considered individually or alone, the cross-section 34, which is open in the first direction indicated by arrow 40, is delimited in the second direction indicated by arrow 42 by main wall section 52 and is delimited along a third direction, which extends perpendicular to the first direction and perpendicular to the second direction and is indicated by double arrow 54 in FIG. 4, is delimited by respective side wall sections 56 and 58 of the shell element 32, which extends at an angle to the main wall section 52. In this case, side wall sections 56 and 58 are connected to one another via the main wall section 52. In particular, it is conceivable that the main wall section 52 is integrally formed with side wall sections 56 and 58. In other words, the open cross-section 34 is delimited by side wall section 56 at least partially, in particular at least predominantly or completely, in a fourth direction, which is perpendicular to the first direction and perpendicular to the second direction and which coincides with the third direction and is indicated by arrow 60 in FIG. 4. The open cross-section 34 is delimited by side wall section 58 at least partially, in particular at least predominantly or completely, in a fifth direction, which extends perpendicular to the first direction and perpendicular to the second direction, and which coincides with the third direction, is opposite the fourth direction, and is indicated by arrow 62 in FIG. 4.

Analogously to this, the second open cross-section 38, which, when considered individually or alone, is open in the first direction as indicated by arrow 40, is delimited at least partially, in particular at least predominantly or completely, in the second direction as indicated by arrow 42, by means of a main wall section 64 of the shell element 36. Along the third direction, the cross-section 38 is delimited on both sides by respective side wall sections 66 and 68 of the shell element 36, which side wall sections extend at an angle to the main wall section 64. This means that the cross-section 38 is delimited at least partially, in particular at least predominantly or completely, in the fourth direction by side wall section 66 and in the fifth direction by side wall section 68. In this case, side wall sections 66 and 68 are connected to one another via the main wall section 64. In particular, the main wall section 64 may be integrally formed with side wall sections 66 and 68.

Overall, it can be seen particularly well from FIG. 4 that respective cross-section 34 or 38 is at least substantially C-shaped and thus has a C-shape, in which the C-shapes are open in the same first direction. In this case, side wall sections 56 and 58 or 66 and 68 are respective legs, and respective main wall section 52 or 64 is a respective web, via which the respective legs are connected to one another. In particular, respective side wall sections 56 and 58 or 66 and 68 are so-called end sections of respective shell element 32 or 36, since side wall sections 56 and 58, when considered individually or alone, have or form first free ends 70 and 72 of the shell element 32. Accordingly, side wall sections 66 and 68, when considered individually or alone, form respective second free ends 74 and 76 of the shell element 36, or side wall sections 66 and 68, when considered individually or alone, have free ends 74 and 76. Since cross-sections 34 and 38 are open in the same direction, the end sections point in the same or the equivalent direction. In other words, side wall sections 56 and 58 protrude, at an angle and thus diagonally or perpendicularly, away from main wall section 52 into the first direction, and side wall sections 66 and 68 protrude, at an angle and thus diagonally or perpendicularly, away from main wall section 64 into the same first direction. In this case, main wall sections 52 and 64 or shell elements 32 and 36 are designed in such a way that shell elements 32 and 36 can or could be pushed into one another, in particular into the second direction or into the first direction. To this end, main wall sections 52 and 64 have different heights which extend along the third direction such that side wall sections 56 and 58 have a first distance apart from each other, which extends along the third direction, and side wall sections 66 and 68 have a second distance apart from each other, which extends along the third direction and have a second distance apart from each other which is less than the first distance.

In a method for producing the suspension arm 24, for example, shell element 36 is moved into the second direction relative to shell element 32 in that shell element 36 is moved into the second direction relative to shell element 32 and is thereby inserted at least partially into shell element 32, in particular into the cross-section 34. As a result, side wall section 66 is at least partially, in particular at least predominantly or completely, covered in the fourth direction by side wall section 56, and side wall section 68 is at least partially, in particular at least predominantly or completely, covered in the fifth direction by side wall section 58.

In the embodiment shown in the figures, shell elements 32 and 36 are inserted or nested into each other such that main wall sections 52 and 64 are spaced apart from each other along the first direction or along the second direction and thus have a distance d apart from each other along the first direction or along the second direction. As a result, for example, the cross-section 34, which is open per se, is supplemented or further developed by the shell element 36 to form a closed cross-section 78, so that the suspension arm 24 as a whole has the closed cross-section 78 and is thus designed as a closed profile when considered individually or alone. Along a longitudinal extension direction of the suspension arm 24, which is indicated by double arrow 80 in FIG. 3 and which is simply designated also as the extension direction, main wall sections 52 and 64 are spaced apart from each other at least partially and thus at least in a longitudinal region along the first or second direction, in particular with the formation of the distance d. Furthermore, it is conceivable for main wall sections 52 and 64 to have mutual contact along the longitudinal extension direction, at least in a further length range along the first or second direction and thus not be spaced apart from each other. Furthermore, it is conceivable for main wall sections 52 and 64 to have mutual contact along the entire longitudinal extension direction of the suspension arm 24 and thus not be spaced apart from one another. The longitudinal extension direction of the suspension arm 24 extends perpendicular to a plane, in particular an imaginary plane, in which the first direction, the second direction, the third direction, the fourth direction, and the fifth direction extend. In other words, main wall sections 52 and 64 may have mutual contact at least partially or over the entire longitudinal extension direction of the suspension arm 24.

In the exemplary embodiment shown in the figures, the suspension arm 24 is designed as a two-point suspension arm. Thus, the suspension arm 24 has exactly two bearings 82 and 84 which, for example, are spaced apart from one another along the longitudinal extension direction of the suspension arm 24. The suspension arm 24 can be connected or is connected to the wheel carrier 26 in an articulated manner by means of the first bearing 82. The suspension arm 24 can be connected or is connected in an articulated manner at least indirectly to the body 14 or to the beam axle by means of the carrier 84. Bearings 82 and 84 cause or form the physical kinematic points 48 and 50. For example, kinematic point 48 lies in the center of gravity of bearing 82 and thus, for example, approximately in the center of the bearing. Consequently, kinematic point 50 lies in the center of gravity of bearing 84 and thus approximately in the center of the bearing. Respective bearing 82 or 84 is designed as a rubber bearing, in particular as a rubber-metal bearing, as a result of which the suspension arm 24 can be elastically connected or is connected to the wheel carrier 26 or to the body 14.

Bearings 82 and 84 are formed separately from shell elements 32 and 36 and open into respective receptacles 86 and 88 of shell elements 32 and 36 formed, for example, as passage openings. In this case, for example, bearings 82 and 84 completely penetrate shell elements 32 and 36 along the third direction, as a result of which the suspension arm 24 can be connected especially advantageously to the wheel carrier 26 and to the body 14 or to the beam axle.

FIG. 3 shows particularly well an installation space 87, which is characterized by hatching in FIG. 3 and which can be obtained or is available by using the suspension arm 24, as compared to conventional suspension arms, in order, for example, to prevent collisions of the suspension arm 24 with components of the vehicle 10 arranged in its surroundings. In particular, the installation space 87 can be obtained in that the shells of shell elements 32 and 36 have different distances away from respective kinematic point 48 or 50.

Furthermore, FIG. 4 shows respective connecting regions of shell elements 32 and 36 with hatching and designated by 89, 90, and 92, respectively. For example, it is possible for shell elements 32 and 36 to be connected to one another via their connecting regions 89 and thus via side wall sections 56 and 66. Alternatively or additionally, it is conceivable for shell elements 32 and 36 to be connected to one another via their connecting regions 90 and thus via side wall sections 58 and 68. Alternatively or additionally, it is possible for shells 32 and 36 to be connected to one another via their respective connecting regions 92 and thus, for example, via main wall sections 52 and 64. It is conceivable that shell elements 32 and 36 are connected to one another in a cohesive and/or force-fitting and/or form-fitting manner, in particular via their respective connecting regions 89 and/or 90 and/or 92. As a result, shell elements 32 and 36 can be especially advantageously and fixedly connected to one another.

The invention claimed is:

1. A suspension arm for a chassis of a vehicle, comprising: a first shell element which has a first open cross-section and having a second shell element which is connected to the first shell element and which has a second open cross-section, wherein the second shell element is arranged at least partially in the first open cross-section, wherein the open cross-sections are open in the same direction;

wherein, for each of the first and the second shell element, the respective open cross-section is delimited in a second direction opposite the direction by a respective main wall section and delimited on both sides along a third direction extending perpendicular to the directions by respective side wall sections of the respective shell element, which side wall sections extend at an angle to the respective main wall section;

wherein the main wall sections are spaced apart from each other along the first direction;

wherein the shell elements are connected to one another in at least three locations, said connections comprising at least two side wall connections on at least two of the side wall sections and at least one main wall connection provided at at least one of the main wall sections, wherein a first hollow area is disposed between the at least one main wall connection and a first of the at least two side wall connections and a second hollow area is disposed between the at least one main wall connection and a second of the at least two side wall connections.

2. The suspension arm according to claim 1, wherein the shell elements are connected to one another in a cohesive and/or force-fitting and/or form-fitting manner.

3. The suspension arm according to claim 1, wherein the respective shell element is designed as one piece.

4. The suspension arm according to claim 1, wherein the respective shell element is designed as a sheet-metal shell.

5. The suspension arm according to claim 1, wherein the suspension arm has at least or exactly two bearings, wherein the suspension arm can be connected in an articulated manner to a wheel carrier of the chassis by a first of the bearings and can be connected in an articulated manner to a body or to a beam axle of the vehicle by a second bearing.

6. The suspension arm according to claim 1, wherein the suspension arm is designed as a two-point suspension arm.

7. A vehicle, comprising: a chassis, which has at least one vehicle wheel and at least one suspension arm, which is connected in an articulated manner to the vehicle wheel in order to guide the vehicle wheel, wherein the suspension arm includes a first shell element having a first open cross-section and a second shell element which is connected to the first shell element and which has a second open cross-section, wherein the second shell element is arranged at least partially in the first open cross-section, wherein the open cross-sections are open in the same direction;

wherein, for each of the first and the second shell element, the respective open cross-section is delimited in a second direction opposite the direction by a respective main wall section and delimited on both sides along a third direction extending perpendicular to the directions by respective side wall sections of the respective shell element, which side wall sections extend at an angle to the respective main wall section;

wherein the main wall sections are spaced apart from each other along the first direction;

wherein the shell elements are connected to one another in at least three locations, said connections comprising at least two side wall connections on at least two of the side wall sections and at least one main wall connection provided at at least one of the main wall sections, wherein a first hollow area is disposed between the at least one main wall connection and a first of the at least two side wall connections and a second hollow area is disposed between the at least one main wall connection and a second of the at least two side wall connections.

\* \* \* \* \*